United States Patent
Hirano

Patent Number: 5,809,353
Date of Patent: Sep. 15, 1998

[54] CAMERA WHICH COMPENSATES FOR MOTION TO SUPPRESS IMAGE BLUR AND TERMINATES MOTION COMPENSATION AUTOMATICALLY AFTER EXPOSURE

[75] Inventor: Shinichi Hirano, Tokyo, Japan

[73] Assignee: Nikon Corporation, Tokyo, Japan

[21] Appl. No.: 819,205

[22] Filed: Mar. 17, 1997

Related U.S. Application Data

[63] Continuation of Ser. No. 442,157, May 16, 1995, abandoned.

[30] Foreign Application Priority Data

May 16, 1994 [JP] Japan ................................ 6-125765
Sep. 2, 1994 [JP] Japan ................................ 6-209713

[51] Int. Cl.⁶ ........................................................ G03B 5/00
[52] U.S. Cl. ............................ 396/55; 348/208; 348/220
[58] Field of Search .................................. 396/52, 53, 54, 396/55; 348/207, 208, 220

[56] References Cited

U.S. PATENT DOCUMENTS

| | | | |
|---|---|---|---|
| 4,965,619 | 10/1990 | Shikaumi et al. | 354/430 X |
| 5,153,633 | 10/1992 | Otani | 354/430 |
| 5,640,612 | 6/1997 | Owashi | 396/55 |

*Primary Examiner*—Eddie C. Lee
*Assistant Examiner*—J. K. Han

[57] ABSTRACT

A camera which compensates for motion and automatically terminates motion compensation after an exposure. An optical system of the camera has a lens which is shiftable in directions perpendicular to the optical axis of the optical system. A motion compensation mechanism compensates for motion of the optical system during an exposure by shifting the lens. The motion compensation mechanism automatically terminates motion compensation after exposure is completed. A switch can select a first mode or a second mode. When the switch selects the first mode, the motion compensation mechanism automatically terminates motion compensation after exposure is completed. When the switch selects the second mode, the motion compensation mechanism continues motion compensation after exposure is completed, thereby allowing continuous shooting with continued motion compensation. An operational member is operable to cause the motion compensation mechanism to start compensating for motion. The motion compensation mechanism compensates for motion for a time period equal to a specific amount of time from the operation of the operational member. Moreover, when the operational member is operated during the time period while the motion compensation mechanism is compensating for motion, the motion compensation mechanism restarts the time period for which motion is compensated. The restarted time period runs for the specific amount of time from the time the operational member was operated while the motion compensation mechanism was compensating for motion.

3 Claims, 9 Drawing Sheets

CAMERA WHICH COMPENSATES FOR MOTION TO SUPPRESS IMAGE BLUR AND TERMINATES MOTION COMPENSATION AUTOMATICALLY AFTER EXPOSURE

This application is a continuation, of application Ser. No. 08/442,157, filed May 16, 1995, now abandoned.

BACKGROUND OF THE INVENTION

1. Field of the Invention

The present invention is related to a motion compensation device for use in a camera to suppress image blur and, more particularly, to the automatic termination of motion compensation after exposure.

2. Description of the Related Art

Optical systems project an image onto an image plane. Conventional image blur is suppression devices suppress, or reduce, blurring of the image. A motion compensation device is a type of image blur suppression device, and compensates for motion incident upon the optical system. Motion is typically imparted to the optical system by vibrations in the optical system, or in a surrounding holding member. In general, conventional motion compensation devices cause a compensation lens to shift counter to the motion of the optical system so as to shift the image projected by the optical system relative to the optical system.

Conventional cameras are equipped with motion compensation devices to suppress image blur resulting from motion of the camera. In a camera, a motion compensation device detects motion, such as motion resulting from hand tremors or vibrations affecting the camera, and then shifts a lens to compensate for the detected motion. Japanese Laid-open Patent Publication Number Hei 2-66535 illustrates an example of a motion compensation device in a single lens optical system, and Japanese Laid-open Patent Publication Number Hei 2-183217 illustrates an example of a motion compensation device in an internal focus type telescopic lens.

The above-described motion compensation devices use a motion compensation switch which is pushed by the photographer to terminate motion compensation. Motion compensation is continuously performed until the motion compensation switch is pushed, even through it is not necessary to continue motion compensation after an exposure is completed. Thus, the photographer is required to push the motion compensation switch to terminate motion compensation, and power is unnecessarily consumed if motion compensation continues after exposure. Further, camera operation is complex since a photographer must push the motion compensation switch to terminate motion compensation at an appropriate time.

SUMMARY OF THE INVENTION

It is therefore an object of the present invention to provide a camera which performs motion compensation to suppress image blur, without requiring the photographer to manipulate a motion compensation switch after exposure to terminate motion compensation.

It is also an object of the present invention to provide a camera which prevents unnecessary power consumption after an exposure operation is completed.

It is a further object of the present invention to provide a camera which does not require a photographer to repeatedly operate a motion compensation switch to continue motion compensation after an exposure when, for example, in a continuous shooting mode.

Objects of the present invention are achieved by providing an optical device which compensates for motion. An optical system of the optical device has a lens which is shiftable in directions perpendicular to the optical axis of the optical system. A motion compensation mechanism compensates for motion of the optical system during an exposure by shifting the lens of the optical system. The motion compensation mechanism automatically terminates motion compensation after exposure is completed.

Further, objects of the present invention are achieved by providing the optical device with a switch for selecting a first mode and a second mode. When the switch selects the first mode, the motion compensation mechanism automatically terminates motion compensation after exposure is completed. When the switch selects the second mode, the motion compensation mechanism continues motion compensation after exposure is completed. Therefore, continuous photographs can be taken while motion compensation is being performed.

Objects of the present invention are also achieved by providing the optical device with an operational member operable to cause the motion compensation mechanism to start compensating for motion. The motion compensation mechanism compensates for motion for a time period equal to a specific amount of time from the operation of the operational member. Moreover, when the operational member is operated during the time period while the motion compensation mechanism is compensating for motion, the motion compensation mechanism restarts the time period for which motion is compensated. The restarted time period runs for the specific amount of time from the time the operational member was operated while the motion compensation mechanism was compensating for motion.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
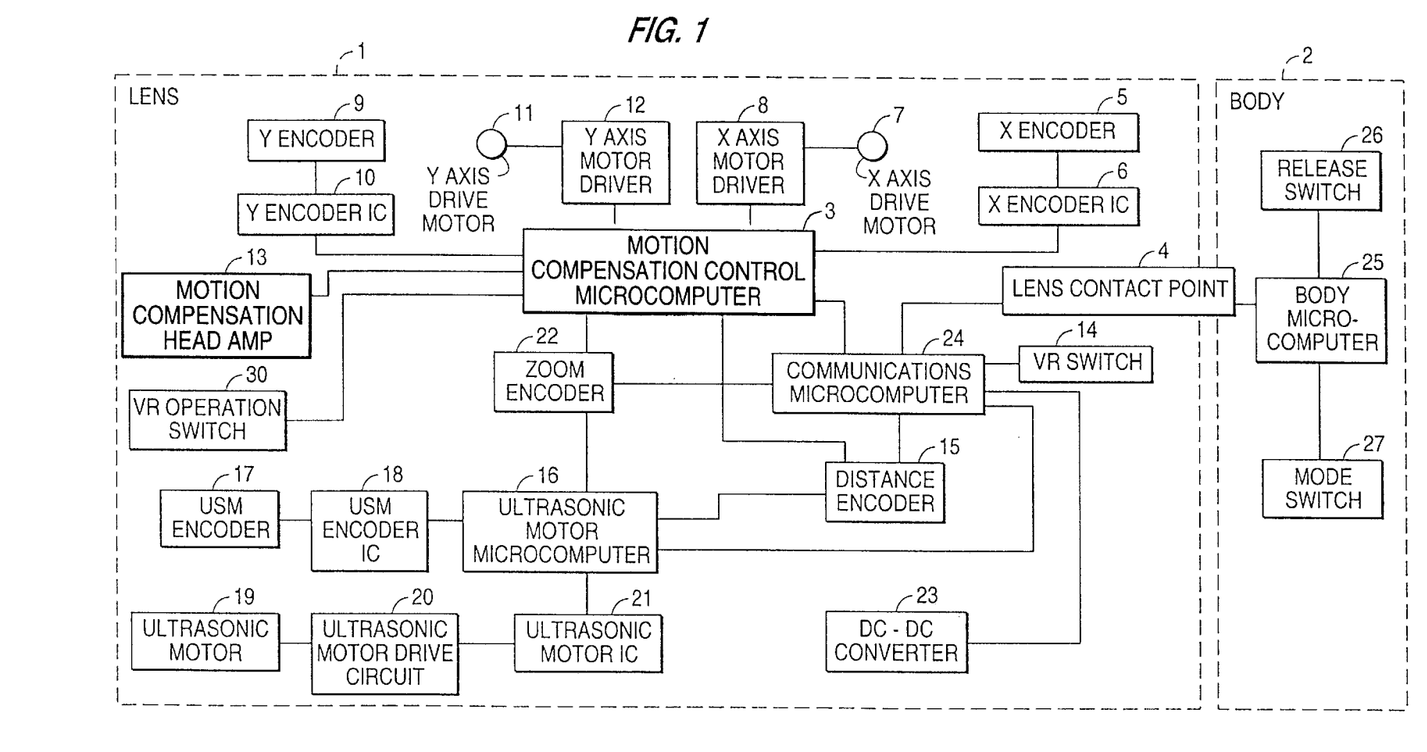
FIG. 1 is block diagram illustrating a camera having a motion compensation device, according to an embodiment of the present invention.

FIG. 1 is block diagram illustrating a camera having a motion compensation device, according to an embodiment of the present invention. Referring now to FIG. 1, the camera includes a lens 1 attached to a camera body 2. Various microcomputers control camera operations. For example, lens 1 includes a motion compensation control microcomputer 3 for controlling motion compensation operations within lens 1, an ultrasonic motor microcomputer 16 for controlling ultrasonic motor operations within lens 1, and a communications microcomputer 24 for controlling communications within lens 1. Body 2 includes a body microcomputer 25 for controlling operations within body 2.

Figure 2:
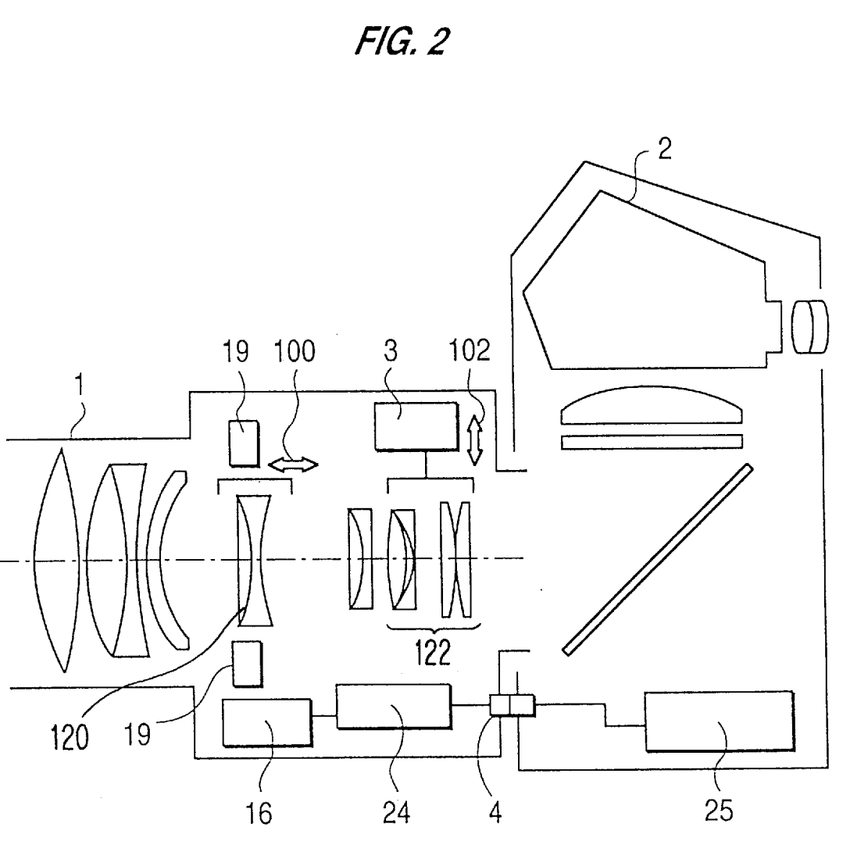
FIG. 2 is a diagram illustrating a camera having a motion compensation device according to an embodiment of the present invention.

The camera includes a conventional photographic optical system (not illustrated) and a conventional motion compensation lens group 122 (see FIG. 2 photographic optical system. A conventional X axis drive motor 7 and a conventional X axis motor driver 8 move the motion compensation lens group 122 (see FIG. 2) in an X axis direction which is perpendicular to the optical axis of the camera. A conventional X encoder 5 detects the amount of motion compensation lens group movement in the X axis direction, and its output is connected to a conventional X encoder IC 6. X encoder IC 6 converts the amount of motion compensation lens group movement in the X direction into electrical signals, and those signals are transmitted to motion compensation control microcomputer 3. X axis motor driver 8 is a circuit to conventionally drive X axis drive motor 7.

Similarly, a conventional Y axis drive motor 11 and a conventional Y axis motor driver 12 move motion compensation lens group 122 (see FIG. 2) in a Y axis direction which is perpendicular to the optical axis. The Y axis direction is also perpendicular to the X axis direction. A conventional Y encoder 9 detects the amount of compensation lens group movement in the Y axis direction, and its output is connected to a conventional Y encoder IC 10. Y encoder IC 10 converts the amount of compensation lens group movement in the Y direction into electrical signals, and those signals are transmitted to motion compensation control microcomputer 3. Y axis motor driver 12 is a circuit to conventionally drive Y axis drive motor 11.

X encoder 5, X encoder IC 6, Y encoder 9, Y encoder IC 10, a conventional zoom encoder 22 and a conventional distance encoder 15 provide positional information of the photographic optical system to motion compensation control microcomputer 3. In response to this positional information and based on the output of body microcomputer 25, motion compensation control microcomputer 3 controls the drive of X axis drive motor 7, X axis motor driver 8, Y axis drive motor 11, and Y motor driver 12. A lens contact point 4 is an electrical contact point used to transmit signals between lens 1 and body 2, and is connected to communications microcomputer 24 and body microcomputer 25.

A conventional motion compensation head amp 13 detects the amount of vibration affecting the camera and converts vibration information into electrical signals. The signals from motion compensation head amp 13 are transmitted to motion compensation control microcomputer 3. Motion compensation head amp 13 can detect vibrations by using, for example, an angular velocity sensor.

Distance encoder 15 is an encoder which conventionally detects the focus position of the photographic optical system, and converts the detected focus position to electric signals. The output of distance encoder 15 is connected to motion compensation control microcomputer 3, ultrasonic motor microcomputer 16, and communications microcomputer 24. A conventional ultrasonic motor 19 drives a conventional focus lens system 120 (see FIG. 2) in the optical axis direction 100 (see FIG. 2), and is controlled by ultrasonic motor microcomputer 16. A conventional ultrasonic motor encoder (USM encoder) 17 is an encoder to detect the amount of movement of ultrasonic motor 19. The output of USM encoder 17 is provided to a conventional ultrasonic (USM) encoder IC 18. USM encoder IC 18 converts the amount of movement of ultrasonic motor 19 to electric signals. The output of USM encoder IC 18 is provided to ultrasonic motor microcomputer 16. Ultrasonic motor 19 is a motor to drive focus lens system 120 (see FIG. 2). Ultrasonic wave motor 20 conventionally generates two drive signals which have drive frequencies particular to ultrasonic motor 19 and which have a mutual ninety (90) degree phase difference. A conventional ultrasonic motor IC 21 operates as an interface between ultrasonic motor microcomputer 16 and ultrasonic motor 20.

Zoom encoder 22 is a conventional encoder which detects the focus distance position, or focal length, of focus lens system 120 (see FIG. 2) and converts this detected distance position to electric signals. The output of zoom encoder 22 is provided to motion compensation control microcomputer 3, ultrasonic motor microcomputer 16, and communications microcomputer 24. A conventional DC-DC converter 23 supplies stabilized DC voltage in relation to fluctuations of a battery voltage, and is controlled based on signals from communications microcomputer 24. Communications microcomputer 24 performs communications between lens 1 and body 2, and transmits commands to motion compensation control microcomputer 3 and ultrasonic motor microcomputer 16 within lens 1.

A release button (not illustrated) is operable by a photographer and has a half-push position and a full-push position. Therefore, the photographer can push the release button to either the half-push position or the full-push position. A release switch 26 is provided in body 2, and comprises a half push switch SW1 (not illustrated) which turns ON when the release button is pushed to the half-push position and is OFF when the release button is not pushed to the half-push position, and a full push switch SW2 which turns ON when the release button is pushed to the full-push position and is OFF when the release button is not pushed to the full-push position. Photographic preparation operations (such as rangefinding and photometry) begin when half push switch SW1 is ON. Therefore, photographic preparation operations begin when the photographer pushes the release button to the half-push position. Exposure begins when full push switch SW2 is turned ON. Therefore, exposure begins when the photographer pushes the release button to the full-push position. A mode switch 27 is manipulated by a photographer to indicate whether motion compensation should terminate after exposure, or whether the camera is in a continuous shooting mode so that motion compensation should continue after exposure.

A vibration reduction (VR) switch 14 is manipulated by a photographer to select a camera mode where motion compensation can be performed and a mode where motion compensation can not be performed. A vibration reduction (VR) operation switch 20 is a switch to decide when to perform motion compensation and operates in conjunction with VR switch 14. Therefore, a photographer turns vibration reduction switch 14 ON to place the camera in a mode where motion compensation can be performed. Then, the photographer turns VR operation switch 30 ON to start motion compensation, and turns VR operation switch 30 OFF to terminate motion compensation. When VR switch 14 is OFF, motion compensation can not be performed, regardless of whether VR operation switch 30 is ON or OFF. Therefore, motion compensation begins from the time VR operation switch 30 is turned ON.

Figure 4:
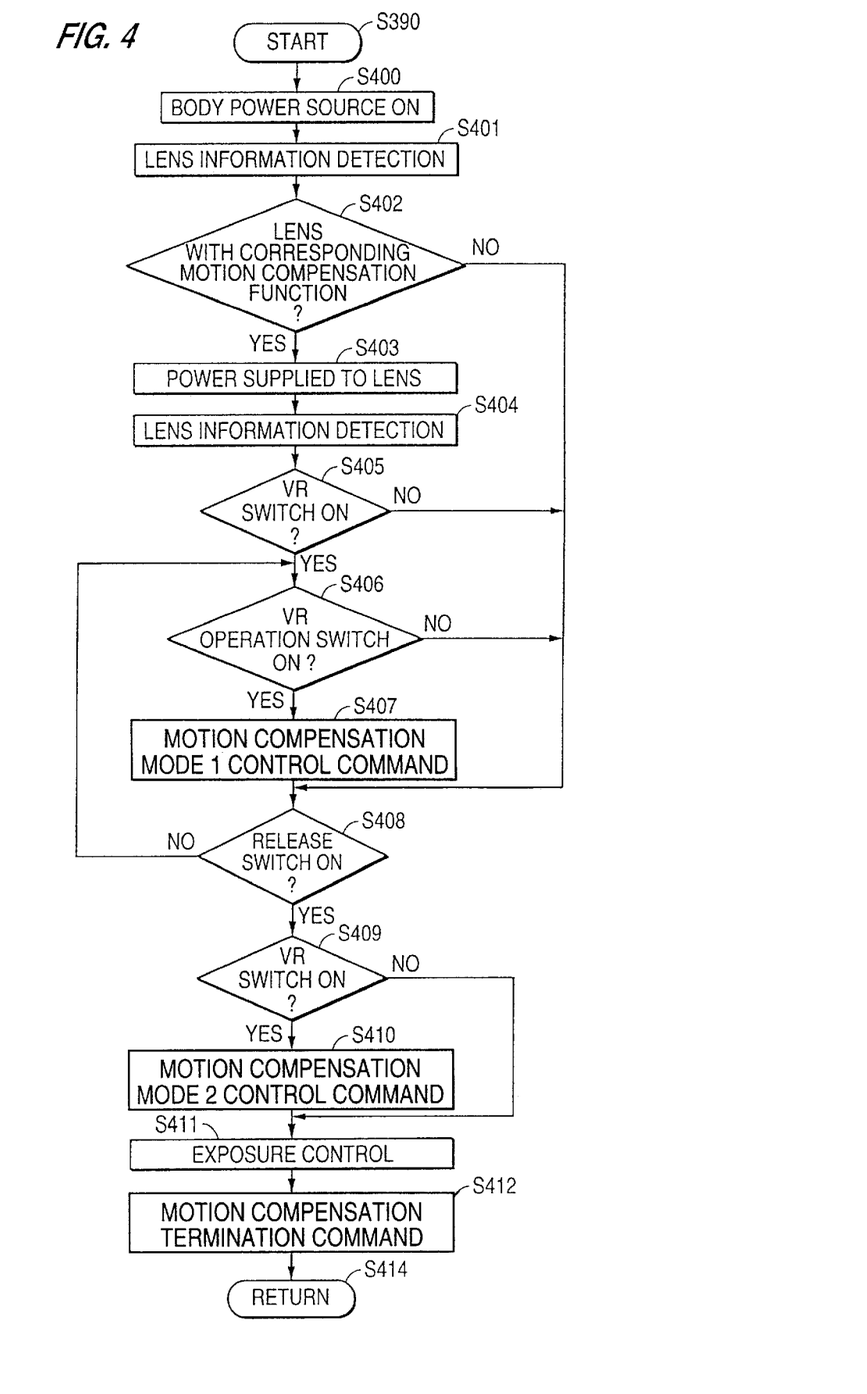
FIG. 4 is a flow chart illustrating a processing sequence of motion compensation control in step S208 of FIG. 3, according to an embodiment of the present invention.
Figure 5:
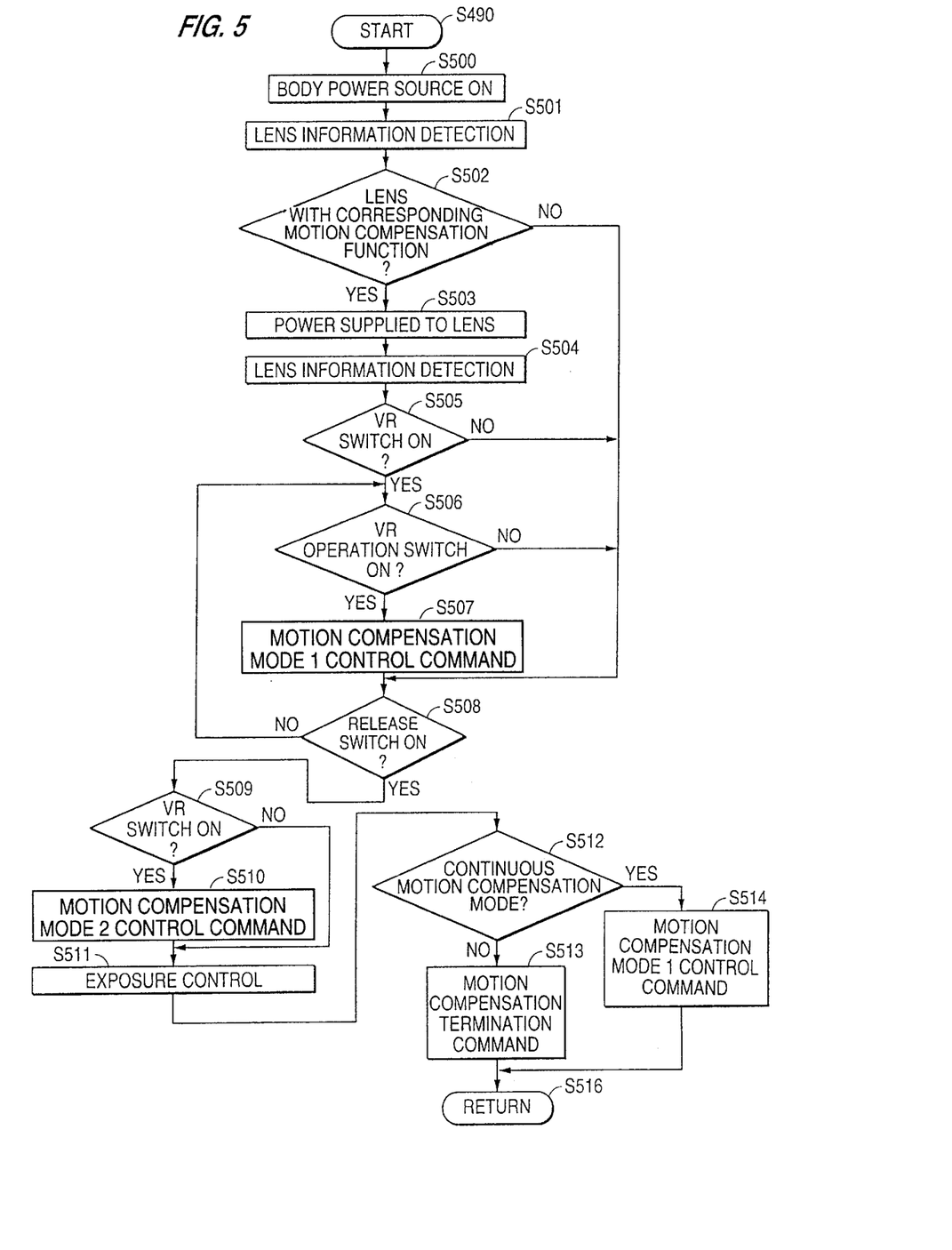
FIG. 5 is a flow chart illustrating a processing sequence of motion compensation control in step S208 of FIG. 3, according to an additional embodiment of the present invention.

VR switch 14 also operates in conjunction with VR operation switch 30 to transfer between a motion compensation control mode one and a motion compensation control mode two. Here, for example, motion compensation control mode one is a camera mode to have coarse control when suppressing image blur after photographic preparations (such as photometry and rangefinding) are begun, and motion compensation control mode two is a camera mode to conduct fine control when suppressing image blur during actual exposure. Therefore, as illustrated by FIGS. 4 and 5, discussed later, fine control (motion compensation control mode two) of motion compensation is always performed during exposure when VR switch 14 is ON; however, VR operation switch 30 is used to select whether course control (motion compensation control mode one) is performed before fine control is performed.

FIG. 2 is a diagram illustrating a camera having a motion compensation device, according to an embodiment of the present invention. As illustrated in FIG. 2, ultrasonic motor 19 drives focus lens system 120 in the optical axis direction 100, in accordance with the control of ultrasonic motor microcomputer 16. Motion compensation microcomputer 3 controls the drive of X axis drive motor 7 (not illustrated in FIG. 2) and y axis drive motor 11 (not illustrated in FIG. 2) to shift a motion compensation lens group 122 in directions 102 which are perpendicular to the optical axis direction 100, thereby suppressing image blur. As illustrated in FIG. 2, ultrasonic motor microcomputer 16 is connected to communications microcomputer 24, and communications microcomputer 24 is connected to body microcomputer 25 through lens contact point 4.

Figure 3:
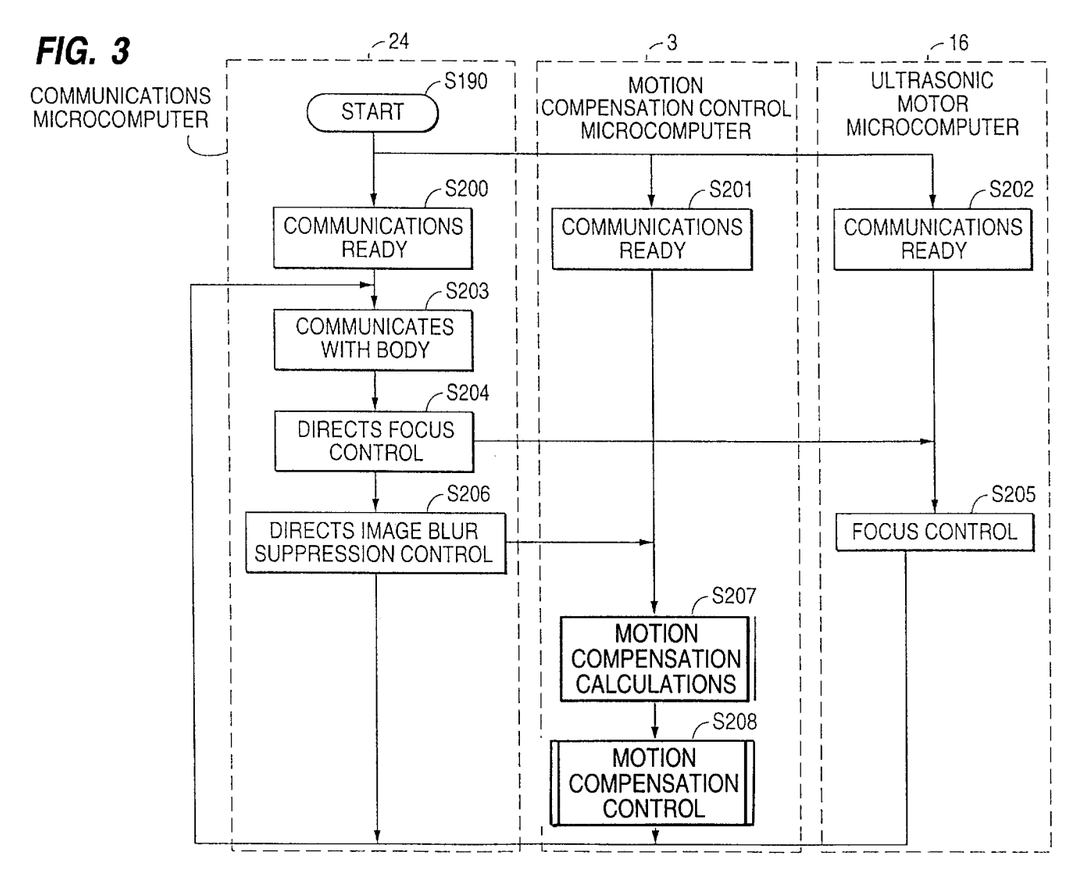
FIG. 3 is a flow chart illustrating a processing sequence of a camera having a motion compensation device, according to an embodiment of the present invention.

FIG. 3 is a flow chart illustrating a processing sequence of a camera having a is motion compensation device, according to an embodiment of the present invention. Referring now to FIG. 3, the process starts in step S190. From step S190, the process simultaneously performs steps S200, S201 and S202. In step S200, communications microcomputer 24 is made ready to perform communication. At the same, in step S201, motion compensation control microcomputer 3 is made ready for communications and, in step S201, ultrasonic motor microcomputer 16 is made ready for communications.

From step S200, the process moves to step S203, where communications microcomputer 24 communicates with body 2 through lens contact point 4. From step S203, the process moves to step S204 where communications microcomputer 24 directs focus control by transmitting focus control directions, received from body 2, to ultrasonic motor microcomputer 16. From step S204, the process moves to step S205 where ultrasonic motor microcomputer 16 executes conventional focus control based on information from zoom encoder 22 and distance encoder 15. Also, from step S204, the process moves to step S206 where communications microcomputer 24 directs motion compensation by transmitting motion compensation directions, received from body 2 to motion compensation control microcomputer 3. In step S207, motion compensation control microcomputer 3 performs conventional motion compensation calculations based on the motion compensation directions received from communications microcomputer 24. From step S207, the process moves to step S208 where motion compensation control microcomputer 3 performs motion compensation control. As illustrated in by FIG. 3, steps S200, S203, S204 and S206 are performed by communications microcomputer 24, steps S201, S207 and S208 are performed by motion compensation control microcomputer 3, and steps S202 and S205 are performed by ultrasonic motor microcomputer 16.

FIG. 4 is a flow chart illustrating a processing sequence of motion compensation control in step S208 of FIG. 3, according to an embodiment of the present invention. As can be seen from FIG. 4, motion compensation automatically terminates after an exposure operation. Referring now to FIG. 4, the process starts in step S390. From step S390, the process moves to step S400 where body microcomputer 25 detects that the body power source (not illustrated) is ON. From step S400, the process moves to step S401 where body microcomputer 25 communicates through communications microcomputer 24 and lens contact point 4, to detect lens information from lens 1. From step S401, the process moves to step S402 where body microcomputer 25 determines, from the lens information obtained in step S401, whether or not lens 1 is a lens having a motion compensation function. If, in step S402, lens 1 is has a motion compensation function, the process moves to step S403. If, in step S402, lens 1 does not have a motion compensation function, the process jumps to step S408.

In step S403, body microcomputer 25 communicates through lens contact point 4, and supplies power to lens 1. From step S403, the process moves to step S404 where body microcomputer 25 communicates with communications microcomputer 24 and lens contact point 4, and detects lens information from lens 1. The lens information includes logical information of VR switch 14 and VR operation switch 30. From step S404, the process moves to step S405 where, from the lens information obtained in step S404, body microcomputer 25 determines whether VR switch 14 is ON or OFF, thereby determining whether or not motion compensation is to be performed. If VR switch 14 is ON (indicating that motion compensation is to be performed) in step S405, the process moves to step S406. If VR switch 14 is OFF (indicating that motion compensation is not to be performed) in step S405, the process jumps to step S408.

In step S406, body microcomputer 25 determines whether VR operation switch 30 is ON or OFF. If VR operation switch 30 is ON in step S406, the process moves to step S407. If VR operation switch 30 is OFF in step S406, the process jumps to step S408. In step S407, body microcomputer 25 communicates through communications microcomputer 24 and lens contact point 4, and transmits a command to motion compensation control microcomputer 3 indicating that the camera is in motion compensation mode 1. From step S407, the process moves to step S408 where it is determined whether or not full push switch SW2 of release switch 26 is ON or OFF. If full push switch SW2 of release switch 26 is ON in step S408 (indicating that the release button is pushed to the full-push position), the process moves to step S409. If SW 2 of release switch 26 if OFF in step S408 (indicating that the release button is not pushed to the full push position), the process moves to step S406.

In step S409, body microcomputer 25 determines, based on whether VR switch 14 is ON or OFF (the status of VR switch 14 is transmitted with information obtained at step S404), whether the camera is in motion compensation mode one or motion compensation mode two. If VR switch 14 is ON in step S409, the process moves to step S410. If VR switch 14 is OFF, the process jumps to step S411. In step S410, body microcomputer 25 communicates through communications microcomputer 24 and lens contact point 4, and transmits a command to motion compensation control microcomputer 3 indicating that the camera is in motion compensation mode two.

From steps S410 and S409, the process moves to step S411 where body microcomputer 25 executes conventional film exposure control. From step S411, the process moves to step S412 where body microcomputer 25 communicates through communications microcomputer 24 and lens contact point 4, and transmits a command to terminate motion compensation to motion compensation control microcomputer 3. From step S412, the process moves to a return at step S414.

In a camera according to an embodiment of the present invention as illustrated in FIG. 4, it is not necessary to continue motion compensation after an exposure is completed in step S411. Therefore, motion compensation is terminated in step S412 and does not continue after the exposure operation. Therefore, power consumption is reduced as compared to conventional cameras which continue motion compensation after exposure. Moreover, in a camera according to an embodiment of the present invention as illustrated in FIG. 4, the photographer is not required to manipulate VR operation switch 30 after an exposure is completed.

FIG. 5 is a flow chart illustrating a processing sequence of motion compensation control in step S208 of FIG. 3, according to an additional embodiment of the present invention. As illustrated in FIG. 5, the process starts in step S490. From step S490, the process moves to step S500. Steps S500 to S511 are the same, respectively, as steps S400 to S411 in FIG. 4 and will briefly be summarized below.

In step S500 body microcomputer 25 detects that the body power source (not illustrated) is ON. From step S500, the process moves to step S501 where body microcomputer 25 communicates through communications microcomputer 24 and lens contact point 4, to detect lens information from lens device 1. From step S501, the process moves to step S502 where body microcomputer 25 determines, from the lens information obtained in step S501, whether or not lens 1 is a lens having a motion compensation function. If, in step S502, lens 1 is a lens having a motion compensation function, the process moves to step S503. If, in step S502, lens 1 is not a lens having a motion compensation function, the process jumps to step S508.

In step S503, body microcomputer 25 communicates through lens contact point 4, and supplies power to lens device 1. From step S503, the process moves to step S504 where body microcomputer 25 communicates with communications microcomputer 24 and lens contact point 4, and detects lens information from lens 1. The lens information includes logical information of VR switch 14 and VR operation switch 30. From step S504, the process moves to step S505 where, from the lens information obtained in step S504, body microcomputer 25 determines whether VR switch 14 is ON or OFF. If VR switch 14 is ON in step S505, the process moves to step S506. If VR switch 14 is OFF in step S505, the process jumps to step S508.

In step S506, body microcomputer 25 determines whether VR operation switch 30 is ON or OFF. If VR operation switch 30 is ON in step S506, the process moves to step S507. If VR operation switch 30 is OFF in step S506, the process jumps to step S508. In step S507, body microcomputer 25 communicates through communications microcomputer 24 and lens contact point 4, and transmits a command to motion compensation control microcomputer 3 indicating that the camera is in motion compensation mode one. From step S507, the process moves to step S508 where it is determined whether or not full push switch SW2 of release switch 26 is ON or OFF. If full push switch SW2 of release switch 26 is ON in step S508, the process moves to step S509. If full push switch SW2 of release switch 26 if OFF in step S508, the process moves to step S506.

In step S509, body microcomputer 25 determines the status of VR switch 14. If VR switch 14 is ON in step S509, the process moves to step S510. If VR switch 14 is OFF in step S509, the process jumps to step S511. In step S510, body microcomputer 25 communicates through communications microcomputer 24 and lens contact point 4, and transmits a command to motion compensation control microcomputer 3 indicating that the camera is in motion compensation mode two. From step S510, the process moves to step S511 where body microcomputer 25 executes conventional film exposure control.

From step S511, the process moves to step S512 where body microcomputer 25 detects whether mode switch 27 is ON or OFF. If mode switch 27 is ON (indicating that the camera is in continuous motion compensation mode) in step S512, the process moves to step S514 where body microcomputer 25 communicates through communications microcomputer 24 and lens contact point 4, and transmits a command to motion compensation control microcomputer 3 indicating that the camera is in motion compensation mode one. Therefore, motion compensation continues in step S514. If mode switch 27 is OFF in step S512, the process moves to step S513 where body microcomputer 25 communicates through communications microcomputer 24 and lens contact point 4, and transmits a command to motion compensation control microcomputer 3 to terminate motion compensation. From steps S513 and S514, the process moves to a return at step S516.

In a camera according to an embodiment of the present invention as illustrated in FIG. 5, the termination or continuation of motion compensation is based on the status of mode switch 28, which is checked prior to the exposure operation. Therefore, the photographer can select whether to terminate motion compensation or continue motion compensation, without having to manipulate VR operation switch 30 again after exposure is completed.

In a camera according to above embodiments of the present invention, motion compensation is automatically terminated after exposure control is completed. As a result, the photographer is not required to manipulate an operation member (such as a button or a switch) after exposure to terminate motion compensation. Moreover, in a camera according to embodiments of the present invention, the photographer can switch (via mode switch 27) between a termination mode in which motion compensation terminates after exposure is completed and a continuous mode where motion compensation continues after exposure. Therefore, it is not necessary for a photographer to manipulate an operational member after exposure is completed, regardless of whether the termination mode or the continuous mode was selected prior to exposure.

In a camera according to embodiments of the present invention, a motion detection mechanism detects vibration or motion of the optical axis of the photographic optical system. A motion compensation drive mechanism causes a part or all of the photographic optical system to shift relative to a photographic image plane, and a motion compensation control mechanism generates motion compensation control signals for controlling the motion compensation drive mechanism based on the output of the motion detection mechanism. Motion compensation is performed during execution of an exposure, and terminates when the exposure is completed. A mode selection switch can be used to switch between a termination mode which terminates motion compensation when an exposure is completed, and a continuous mode which continues to perform motion compensation after an exposure is completed.

Figure 6:
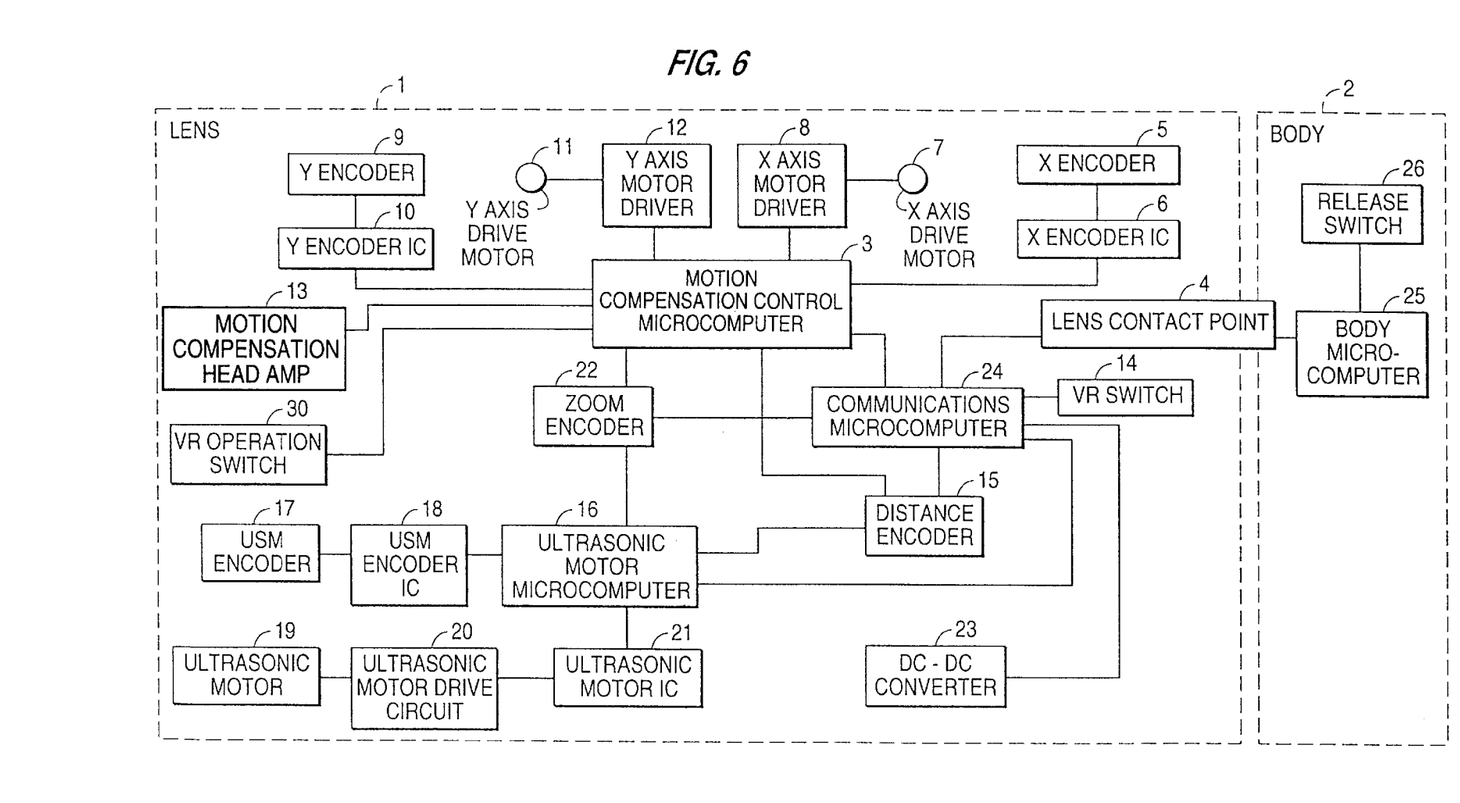
FIG. 6 is a block diagram illustrating a camera having a motion compensation device, according to an embodiment of the present invention.

FIG. 6 is a block diagram illustrating a camera having a motion compensation device, according to an embodiment of the present invention. The camera illustrated in FIG. 6 has the same elements as in FIG. 1, except the camera in FIG. 6 does not include mode switch 27. Moreover, the camera in FIG. 6 also has a structure as illustrated in FIG. 2 and follows the processing sequence illustrated in FIG. 3.

Figure 7:
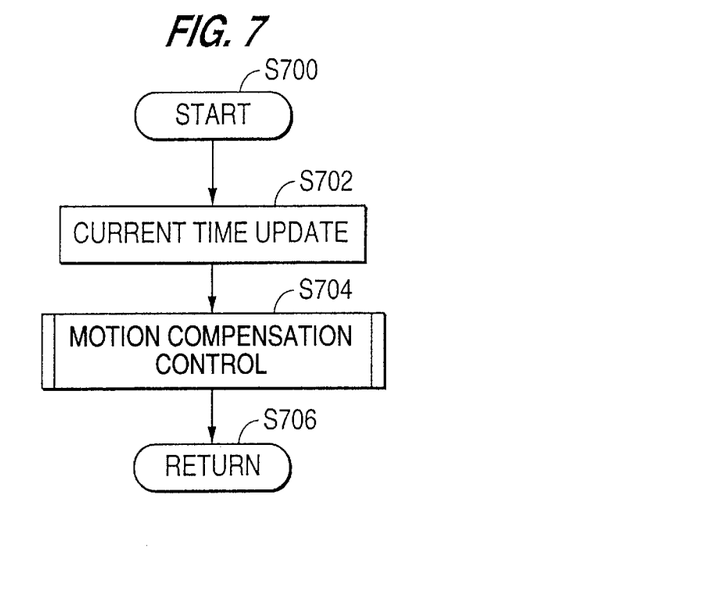
FIG. 7 is a flow chart illustrating a processing sequence of a camera having a motion compensation device, according to an embodiment of the present invention.

FIG. 7 is a flow chart illustrating a processing sequence of a camera having a motion compensation device, as illustrated in FIG. 6, according to an embodiment of the present invention. More specifically, FIG. 7 illustrates a timer interrupt processing performed by motion compensation microcomputer 3 in FIG. 6, according to an embodiment of the present invention. The process is FIG. 7 is performed when a timer interrupt is generated by motion compensation control microcomputer 3. Referring now to FIG. 7, the process starts in step S700. From step S700, the process moves to step S702 where a value of the current time is updated and stored. From step S702, the process moves to step S704 where motion compensation control is performed. More specifically, in step S704 of FIG. 7, motion compensation control microcomputer 3 performs steps S201, S207 and S208 illustrated in FIG. 3. From step S704, the process moves to a return at step S706. Therefore, from step S706, the process returns to the control flow being executed before the timer interrupt was performed by motion compensation microcomputer 3.

Figure 8:
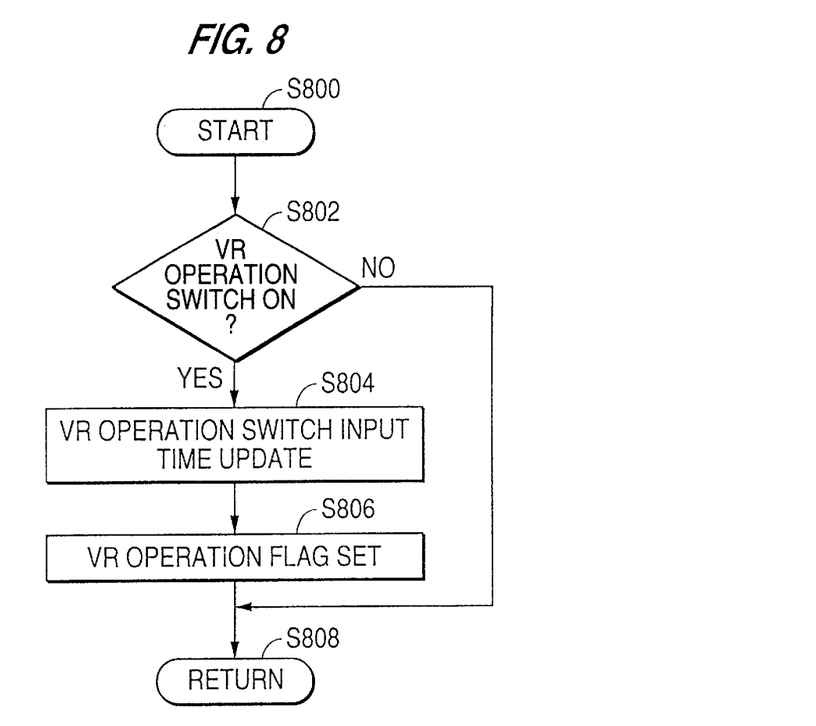
FIG. 8 is a flow chart illustrating a processing sequence of a camera having a motion compensation device, according to an embodiment of the present invention.

FIG. 8 is a flow chart illustrating a processing sequence of a camera having a motion compensation device, as illustrated in FIG. 6, according to an embodiment of the present invention. More specifically, FIG. 8 is a flow chart illustrating the operation of an external interruption process performed by motion compensation control microcomputer 3 when VR operation switch 30 is manipulated by the photographer. Referring now to FIG. 8, the process starts in step S800 upon the manipulation of VR operation switch 30. From step S800, the process moves to step S802 where it is determined whether VR operation switch 30 is ON. If VR operation switch 30 is OFF in step S802, the process moves to step S808 where a return is executed. If VR operation switch 30 is ON is step S802, the process moves to step S804. In step S804, the input time of VR operation switch 30 (that is, the time at which VR operation switch 30 was manipulated) is updated by replacing the input time of the VR operation switch 30 with the current time. From step S804, the process moves to step S806 where a VR operation flag (not illustrated) is set. Therefore, according to FIG. 8, the input time of VR operation switch 30 is updated whenever VR operation switch 30 is appropriately manipulated.

Figure 9:
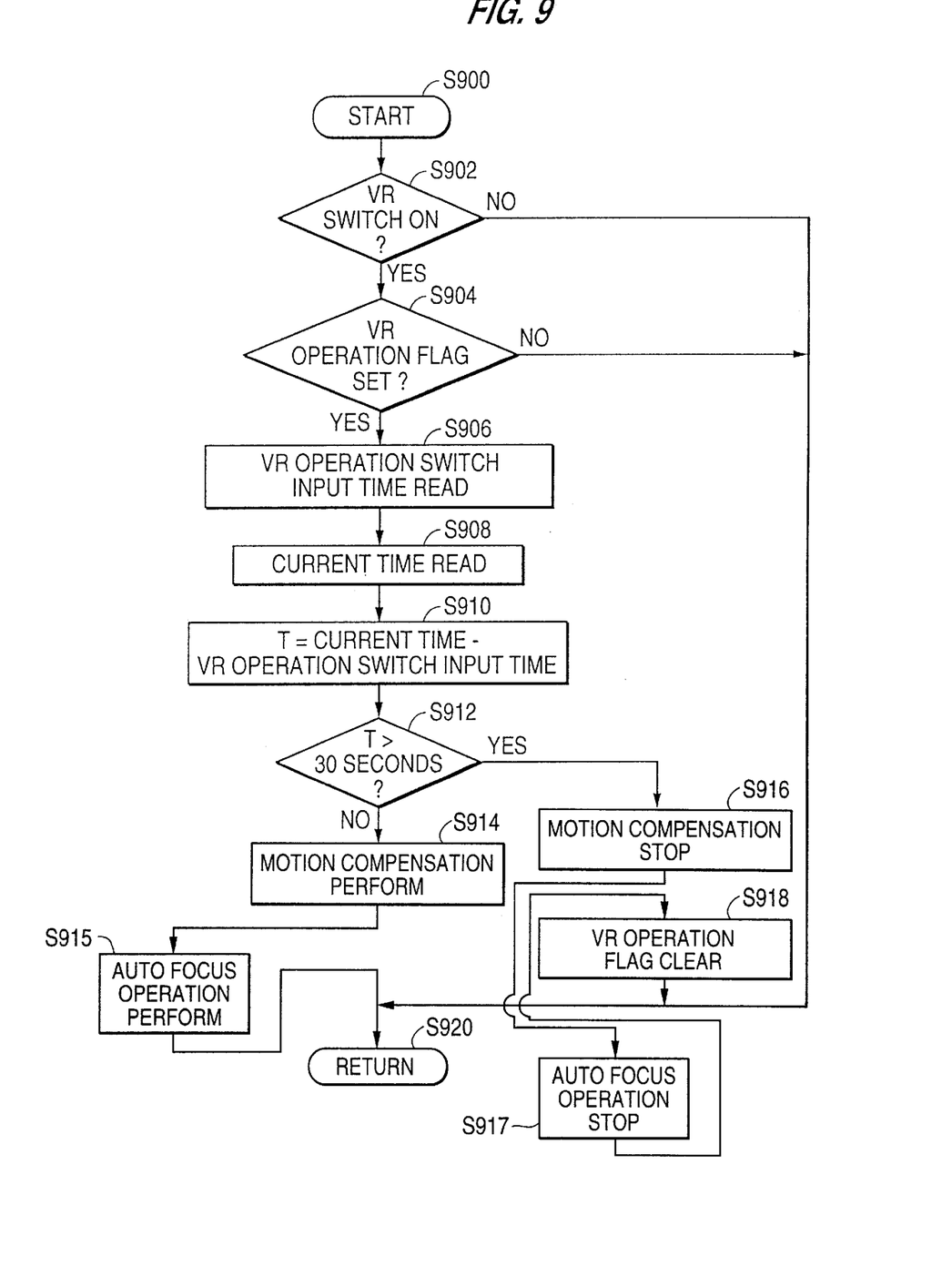
FIG. 9 is a flow chart illustrating a processing sequence of motion compensation control in step S208 of FIG. 3 of a camera having a motion compensation device, according to an embodiment of the present invention.

FIG. 9 is a flow chart illustrating a processing sequence of a camera having a motion compensation device, as illustrated in FIG. 6, according to an embodiment of the present invention. More specifically, FIG. 9 is a flow chart illustrating a process which maintains motion compensation by motion compensation microcomputer 3 for a fixed period of time, and represents the motion compensation control of step S208 in FIG. 3. Referring now to FIG. 9, the process starts in step S900. From step S900, the process moves to step S902 where a determination is made as to whether VR switch 14 is ON or OFF. If VR switch 14 is OFF in step S902, the process moves to step S920 where a return is executed. If VR switch 14 is ON in step S902, the process moves to step S904 where a determination is made as to whether the VR operation flag is set. If the VR flag is not set in step S904, the process moves to step S920 where a return is executed. If the VR operation flag is set in step S904, the process moves to step S906 where VR operation switch 30 input time which was updated in step S804 (FIG. 8) is read. From step S908, the process moves to step S910, where the current time which was updated in step S702 (FIG. 7) is read. From step S908, the process moves to step S910 where the time difference T of VR operation switch 30 input time read in step S906 and the current time read in step S908 is computed. From step S910, the process moves to step S912 where a determination is made as to whether the time difference T computed in step S910 is greater than, for example, thirty (30) seconds. When the time difference T is greater than 30 seconds in step S912, the process moves to step S916 where motion compensation is terminated. From step S916, the process moves to step S917 where auto focus is stopped. From step S917, the process moves to step S918 where the VR operation flag is cleared. From step S918, the process moves to step S920 where a return is executed. When the time difference T in step S910 is equal to or smaller than thirty (30) seconds, the process moves to step S914 where motion compensation is performed. From step S914, the process moves to step S915 where a conventional auto focus operation is performed, and then to step S920 where a return is executed.

Figure 10:
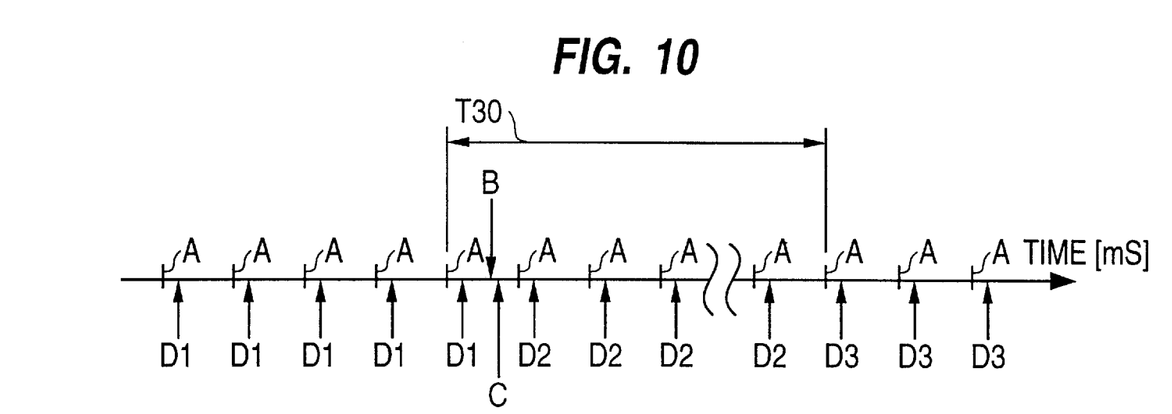
FIG. 10 is a diagram illustrating the interaction of the flow charts illustrated in FIGS. 3, 7, 8 and 9, according to an embodiment of the present invention.

FIG. 10 is a diagram illustrating the interaction of the flow charts illustrated in FIGS. 3, 7, 8 and 9, according to an embodiment of the present invention. In FIG. 10, points "D1", "D2" and "D3" illustrate the operation of steps S201, S207 and S208 of FIG. 3 (where step S208 executes the processing sequence illustrated in FIG. 9). At point D1, motion compensation is stopped. At point D2, motion compensation is performed in step S914 of FIG. 9. At point D3, motion compensation is stopped in step S916 of FIG. 9. At each point "A", the timer interrupt processing of FIG. 7 is executed. Point "B" represents a point where VR operation switch 30 is manipulated (turned ON). Point "C" represents a point where the processing sequence of FIG. 8 is performed. T30 represents a thirty (30) second time period.

In a camera according to an embodiment of the present invention, a photographer can operate VR operation switch 30 when motion compensation is required. Motion compensation can then continue for a fixed period of time (for example, thirty seconds), and stop after the fixed period of time has elapsed. Therefore, the photographer does not have to operate VR operation switch 30 (or a switch such as mode switch 27) a second time to terminate motion compensation.

Moreover, in a camera according to embodiments of the present invention, motion compensation is performed independent of the function of body 2 to maintain a power source for a fixed period of time for various camera functions (such as rangefinding, photometry and focus control). Therefore, in a case where photometric processing and focus compensation processing of body 2 are not required, and motion compensation is required, it is possible to restrict unnecessary electric power consumption by performing only motion compensation. Moreover, when motion compensation is required, motion compensation is no longer interrupted inadvertently by the function of body 2 to maintain a power source for a fixed period of time. Therefore, a photographer can continue to observe a subject on which motion compensation is being performed.

In a camera according to above embodiments of the present invention, an optical system has a lens which is shiftable in directions perpendicular to the optical axis of the optical system. A motion compensation mechanism compensates for motion of the optical system during an exposure by shifting the lens of the optical system. The motion compensation mechanism automatically terminates motion compensation after exposure is completed. An operational member (such as VR operation switch 30) is operable to cause the motion compensation mechanism to start compensating for motion. The motion compensation mechanism compensates for motion for a time period equal to a specific amount of time from the operation of the operational member. Moreover, when the operational member is operated during the time period while the motion compensation mechanism is compensating for motion, the motion compensation mechanism restarts the time period for which motion is compensated. The restarted time period runs for the specific amount of time from the time the operational member was operated while the motion compensation mechanism was compensating for motion.

The present invention is not intended to be limited to the specific embodiments discussed above, and various modifications of the above embodiments are, of course, possible. For example, in the embodiments of the present invention, a mechanism for communicating between lens 1 and body 2 was described. However, the present invention can also be applied to a device which does not use this type of mechanism for communicating between lens 1 and body 2. Moreover, motion compensation is described above as being performed on the lens side of the camera and independent of the body's function of maintaining power for a specified period of time. However, embodiments of the present invention can also be applied to an optical device which has a common control device (such as a CPU) for controlling both the lens and the body.

According to above embodiments of the present invention, motion compensation continues for a specified period of time from a start time. Motion compensation terminates after the specified period of time. Therefore, it is possible to reduce unnecessary electric power consumption through a simple operation without inadvertently interrupting control.

According to above embodiments of the present invention, motion compensation continues only for a specified period of time from the start of motion compensation control, and stops motion compensation control stops after the specified period of time has elapsed. The time of the start of motion compensation control is reset when a motion compensation operation switch is manipulated during the specified period of time. Therefore, if the photographer operates the motion compensation operation switch once when motion compensation is required, it becomes possible to continue motion compensation control for a specified period of time and to automatically stop motion compensation control after the specified period of time has elapsed. Moreover, when motion compensation control is required, such control is no longer inadvertently interrupted by the function of maintaining a power source for a specified period of time, and a photographer can continue to observe a subject on which motion compensation is being performed.

The invention is not intended to be limited to the above-described embodiments of the present invention and various modifications are, of course possible. For example, in above embodiments, a single lens reflex camera is illustrated in which the lens and the body are autonomously attachable and detachable; however, embodiments of the present invention could also apply to a lens shutter camera which cannot exchange lenses.

Embodiments of the present invention are described as relating to conventional film exposure control. Thus, the present invention relates to the exposure of light from a subject onto a film. However, the present invention is not intended to be limited to an exposure onto a "film", and relates to an exposure onto virtually any type of image recording medium. Such recording medium can include, for example, optical discs and magnetic recording mediums.

Although a few preferred embodiments of the present invention have been shown and described, it would be appreciated by those skilled in the art that changes may be made in these embodiments without departing from the principles and spirit of the invention, the scope of which is defined in the claims and their equivalents. Further, one of ordinary skill in the art will recognize that while the preferred embodiments have been shown and described as being used within an optical camera, they may be adapted for use in any device which it is desirable to suppress blurring of an image formed by an optical system. For example, embodiments of the present invention can be applied in camcorders, motion picture cameras, telescopes, binoculars, microscopes, range finding equipment, lasers, fiber optic communication systems, various optical projection systems and CD mastering systems.

What is claimed is:

1. An optical device which performs an exposure of light onto an image recording medium, comprising:
   an optical system;
   a motion compensation mechanism to compensate for motion of the optical system; and
   a switch, which selects a first mode and a second mode, wherein
      when the switch selects the first mode, the motion compensation mechanism automatically terminates motion compensation after exposure is completed,
      when the switch selects the second mode, the motion compensation mechanism continues motion compensation after exposure is completed,
      the optical device is a camera,
      the first mode indicates individual photograph mode, and
      the second mode indicates continuous photograph mode, the second mode allowing the motion compensation mechanism to continue motion compensation after exposure is completed to allow continuous photographs to be taken while the motion compensation mechanism continuously compensates for motion.

2. An optical device as in claim 1, wherein:
   the optical system comprises a lens which is shiftable in directions perpendicular to the optical axis of the optical system, and
   the motion compensation mechanism compensates for motion by shifting the lens in the directions perpendicular to the optical axis.

3. A camera having an individual photograph mode for performing an individual exposure and a continuous photograph mode for performing a first exposure and continuous, subsequent exposures, the camera comprising: p1 an optical system; and p1 a motion compensation mechanism to compensate for motion of the optical system, wherein when the camera is in the individual photograph mode, the motion compensation mechanism compensates for motion during the individual exposure and automatically terminates after the individual exposure is completed, and when the camera is in the continuous photograph mode, the motion compensation mechanism compensates for motion during the first exposure and continuously compensates for motion during the continuous, subsequent exposures.

* * * * *

UNITED STATES PATENT AND TRADEMARK OFFICE
CERTIFICATE OF CORRECTION

PATENT NO.: 5,809,353
DATED : September 15, 1998
INVENTOR(S): Shinichi HIRANO

It is certified that error appears in the above-identified patent and that said Letters Patent is hereby corrected as shown below:

Column 12, line 67, (claim 3), delete "p1".

Column 13, line 1, (claim 3), delete "p1".

Signed and Sealed this

Nineteenth Day of January, 1999

*Attest:*

*Attesting Officer*

*Acting Commissioner of Patents and Trademarks*